(12) United States Patent
Edwards

(10) Patent No.: US 10,227,027 B2
(45) Date of Patent: Mar. 12, 2019

(54) SEAT BACK WITH PIVOTABLE ARMREST AND ARMREST RESTRICTOR

(71) Applicant: Lear Corporation, Southfield, MI (US)

(72) Inventor: Chris Edwards, Staffordshire (GB)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 15/639,461

(22) Filed: Jun. 30, 2017

(65) Prior Publication Data

US 2019/0001849 A1 Jan. 3, 2019

(51) Int. Cl.
*B60N 2/75* (2018.01)
*B60N 2/20* (2006.01)

(52) U.S. Cl.
CPC ............. *B60N 2/757* (2018.02); *B60N 2/206* (2013.01)

(58) Field of Classification Search
CPC ...... B60N 2/757; B60N 2/206; B60N 2/4613; B60N 2/43; B60N 2/433; B60N 2/4606; B60N 2/4633; B60N 2/427; B60N 2/4435; B60N 2002/4455
USPC .................................. 297/378.1, 378.11, 113
See application file for complete search history.

(56) References Cited

U.S. PATENT DOCUMENTS

| 4,438,974 | A | 3/1984 | Kresky et al. |
| 4,579,384 | A | 4/1986 | Sharod |
| 4,707,010 | A | 11/1987 | Croft et al. |
| 5,100,202 | A | 3/1992 | Hughes |
| 5,433,503 | A * | 7/1995 | De Filippo ............ B60N 2/757 297/115 |
| 5,658,043 | A | 8/1997 | Davidson |
| 5,873,633 | A * | 2/1999 | Lang .................... B60N 2/3084 297/411.32 |
| 6,047,444 | A | 4/2000 | Braun |
| 6,742,845 | B2 | 6/2004 | Nock |
| 7,178,865 | B2 * | 2/2007 | Yetukuri ................ B60N 2/757 297/113 |
| 9,469,225 | B1 | 10/2016 | Salenbien et al. |
| 2007/0205638 | A1 * | 9/2007 | Schlecht ................ B60N 2/757 297/113 |
| 2007/0284919 | A1 * | 12/2007 | Woth ..................... B60N 2/206 297/113 |
| 2012/0104822 | A1 * | 5/2012 | Henke .................... B60N 2/757 297/411.32 |
| 2014/0138999 | A1 * | 5/2014 | Stesl ....................... B60N 2/36 297/378.12 |
| 2014/0319868 | A1 * | 10/2014 | von Rothkirch und Panthen ....... B60N 2/43 296/24.34 |
| 2015/0097406 | A1 * | 4/2015 | Tanaka ................. B60N 2/5816 297/378.1 |
| 2016/0325650 | A1 * | 11/2016 | Furukawa .............. B60N 2/757 |
| 2017/0334324 | A1 * | 11/2017 | Keller .................. B60N 2/4633 |

(Continued)

*Primary Examiner* — Mark R Wendell
(74) *Attorney, Agent, or Firm* — MacMillan, Sobanski & Todd, LLC

(57) ABSTRACT

A seat assembly includes a seat back that is mounted on a base for relative movement between a first seat position and a second seat position. An armrest is mounted on the seat back for relative movement between a stowed position and a use position. An armrest restrictor prevents movement of the armrest relative to the seat back when the seat back is moved from the first seat position toward the second seat position and allows movement of the armrest relative to the seat back when the seat back is in the first seat position.

14 Claims, 9 Drawing Sheets

(56) References Cited

U.S. PATENT DOCUMENTS

2018/0065520 A1\* 3/2018 Aktas .................. B60N 2/4613
2018/0118069 A1\* 5/2018 Miyazaki ............... A47C 7/543

\* cited by examiner

SEAT BACK WITH PIVOTABLE ARMREST AND ARMREST RESTRICTOR

BACKGROUND OF THE INVENTION

This invention relates to a movable seat back that includes a movable armrest and an armrest movement restrictor. More specifically, this invention relates to pivotable seat back that includes a pivotable armrest having an armrest restrictor that retains the armrest in position relative to the seat back when the seat back is moved from an initial position.

Many vehicles include seats having one or more armrests for the comfort of a passenger. For example, a vehicular bench seat may include a center armrest for shared use by passengers on either side. Many of such armrests are able to be moved between a use position and a stowed position. Typically, an armrest may be moved between the two positions by pivoting it relative to the seat. Thus, the center armrest on the bench seat may be positioned in the use position, where it is available for use by two adjacent passengers, or it may be located in the stowed position, where the armrest is nested in a seat back so that a third passenger may occupy the center of the bench seat.

Many vehicles have cargo areas, such as trunks or beds, located behind the passenger seats. In some vehicles, the passenger seats may be moved in order to create a larger cargo floor in order to allow longer items to be transported within the vehicle. A seat back of rear passenger seats may be able to be moved from an upright position, where the seat is available to be occupied by the passenger, to a folded position, where a rear surface of the seat back provides a cargo pass-through or an extended cargo floor. The seat back in these types of seats may be moved by pivoting it relative to a seat bottom.

In some vehicles, both the armrest is movable and the seat back is movable. For example, the bench seat can include a center seat portion with a pivotable armrest, and the center portion may also be folded down to provide a pass-through to a trunk of the vehicle. When the center seat portion is moved from the folded position to the upright position, it is desirable that the armrest move up with the seat. However, the weight of the armrest will tend to keep the armrest in the use position, and the armrest may undesirably remain deployed as the seat back is moved upright relative to the armrest. It is known to overcome this difficulty by providing an interference fit between the armrest and the seat back, so that the weight of the armrest does not provide sufficient force to allow the armrest to fall away from the seat back. However, this increases the amount of force the passenger must apply in order to move the armrest from the stowed position. It is also known to provide a mechanical latch that retains the armrest in position relative to the seat back, such as shown in U.S. Pat. No. 6,047,444. When a passenger wishes to move the armrest from the stowed position, a release is used to disengage the latch. However, this requires that the passenger be able to reach and interact with the release. It would be advantageous to have an improved way to retain the armrest in position relative to the movable armrest.

SUMMARY OF THE INVENTION

This invention relates to a seat assembly. The seat assembly includes a seat back. The seat back is mounted on a base for relative movement between a first seat position and a second seat position. The seat assembly includes an armrest mounted on the seat back for relative movement between a stowed position and a use position. The seat assembly also includes an armrest restrictor that prevents movement of the armrest relative to the seat back when the seat back is moved from the first seat position toward the second seat position. The armrest restrictor further allows movement of the armrest relative to the seat back when the seat back is in the first seat position.

In another embodiment, this invention also relates to a seat assembly. The seat assembly includes a seat back. The seat back is mounted on a base for relative rotational movement between an upright position and a folded position. The base includes a stop surface. The seat assembly includes an armrest. The armrest is mounted for rotational movement relative to the seat back between a stowed position and a use position. The armrest includes a stop rod that moves relative to the seat back along a stop path when the armrest is moved relative to the seat back. The seat assembly also includes an armrest restrictor. The armrest restrictor includes a restrictor body that is attached to the seat back for relative rotational movement between a release position and a block position. A block is attached to the restrictor body. The block is located in the stop path when the restrictor body is in the block position. The block is not located in the stop path when the restrictor body is in the release position. The armrest restrictor includes a biasing element that biases the restrictor body toward the block position. A restrictor stop is attached to the restrictor body. The restrictor stop is engaged with the stop surface when the seat back is in the upright position and the restrictor body is moved out of the stop position against the biasing force.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
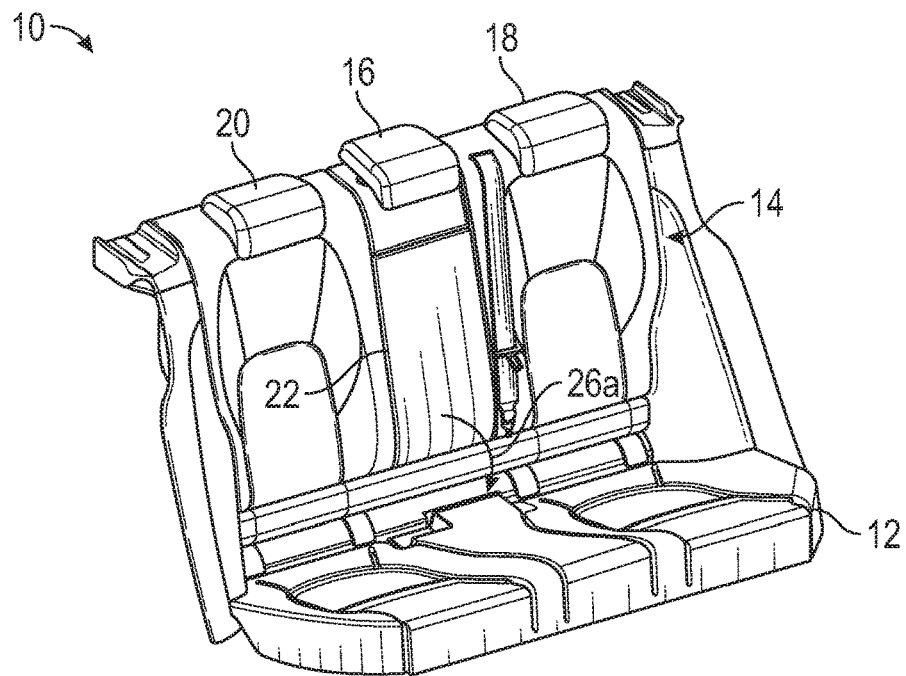
FIG. 1 is a perspective view of a bench seat including an armrest shown in a stowed position.

Referring now to the drawings, there is illustrated in FIG. 1 a perspective view of a seat, indicated generally at 10. The illustrated seat 10 is a vehicle bench seat, but it may be any desired type of seat. The seat 10 includes a seat bottom 12, which provides a common cushion for all occupants of the seat 10. The seat 10 also includes a seat assembly, indicated generally at 14, which provides back support for all occupants of the seat 10. The illustrated seat assembly 14 includes a seat back 16, a second back portion 18, and a third back portion 20. In the illustrated embodiment, the seat back 16 is a center portion, and the second back portion 18 and the third back portion 20 are side portions located on opposed sides of the seat back 16. However, the seat assembly 14 may include any desired number and positioning of back portions.

Figure 2:
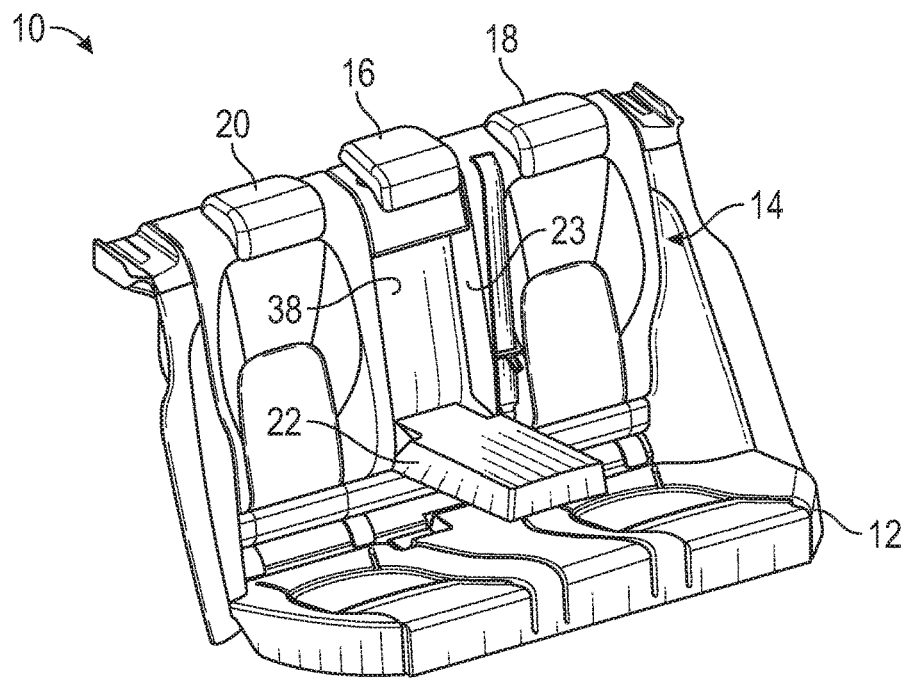
FIG. 2 is a perspective view of the bench seat illustrated in FIG. 1 showing the armrest in a use position.

The seat 10 includes an armrest 22 that is located on the seat assembly 14. The illustrated armrest 22 is located on the seat back 16, but may be located in any desired position on the seat assembly 14. The armrest 22 is a movable armrest that may be pivoted relative to the seat back 16 between a stowed position (shown in FIG. 1) and a use position (shown in FIG. 2). When the armrest 22 is in the stowed position, it is located in an armrest nest 23 in the seat back 16 so that the seat 10 is adapted to accommodate three occupants. When the armrest 22 is in the use position, the seat 10 is adapted to accommodate two occupants, with the armrest 22 located between them.

Figure 3:
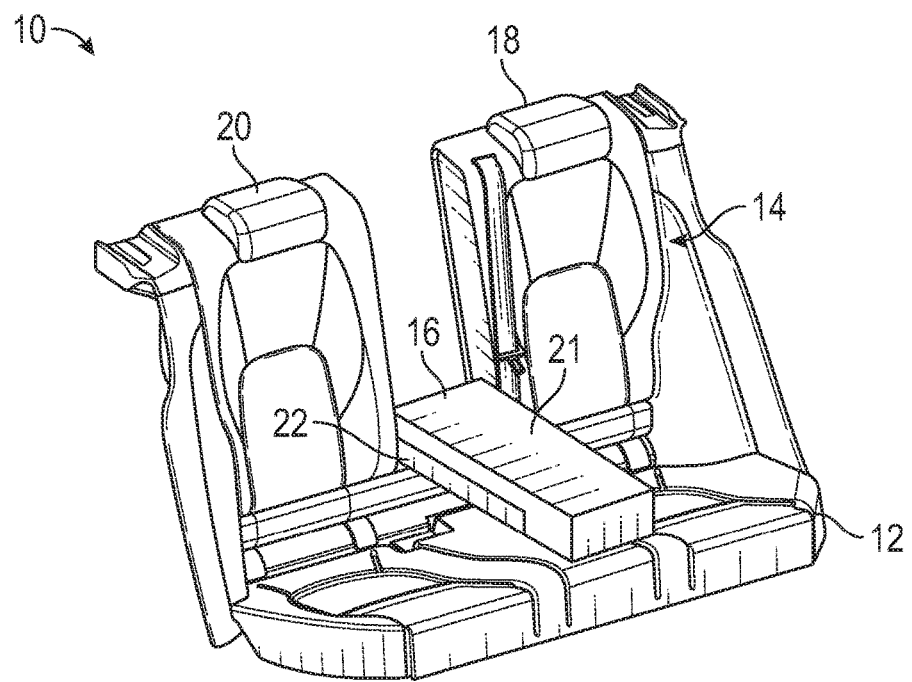
FIG. 3 is a perspective view of the bench seat illustrated in FIG. 2 showing a seat portion in a folded position.

The seat back 16 of the seat assembly 14 may also be moved relative to the seat bottom 12 between a first seat position and a second seat position. The illustrated seat back 16 may be moved between an upright position (shown in FIGS. 1 and 2) and a folded position (shown in FIG. 3). However, the first seat position and the second seat position may be any desired positions of the seat back 16. The illustrated seat back 16 is pivoted in an armrest rotation direction 26a relative to the seat bottom 12 when it is moved between the upright position and the folded position. However, the seat back 16 may be moved in any desired fashion. When in the folded position, the seat back 16 provides an extended cargo surface 21. In the illustrated seat 10, the second back portion 18 and the third back portion 20 may also be moved from their respective upright positions (shown in FIG. 3), to folded positions (not shown), if desired.

Figure 4:
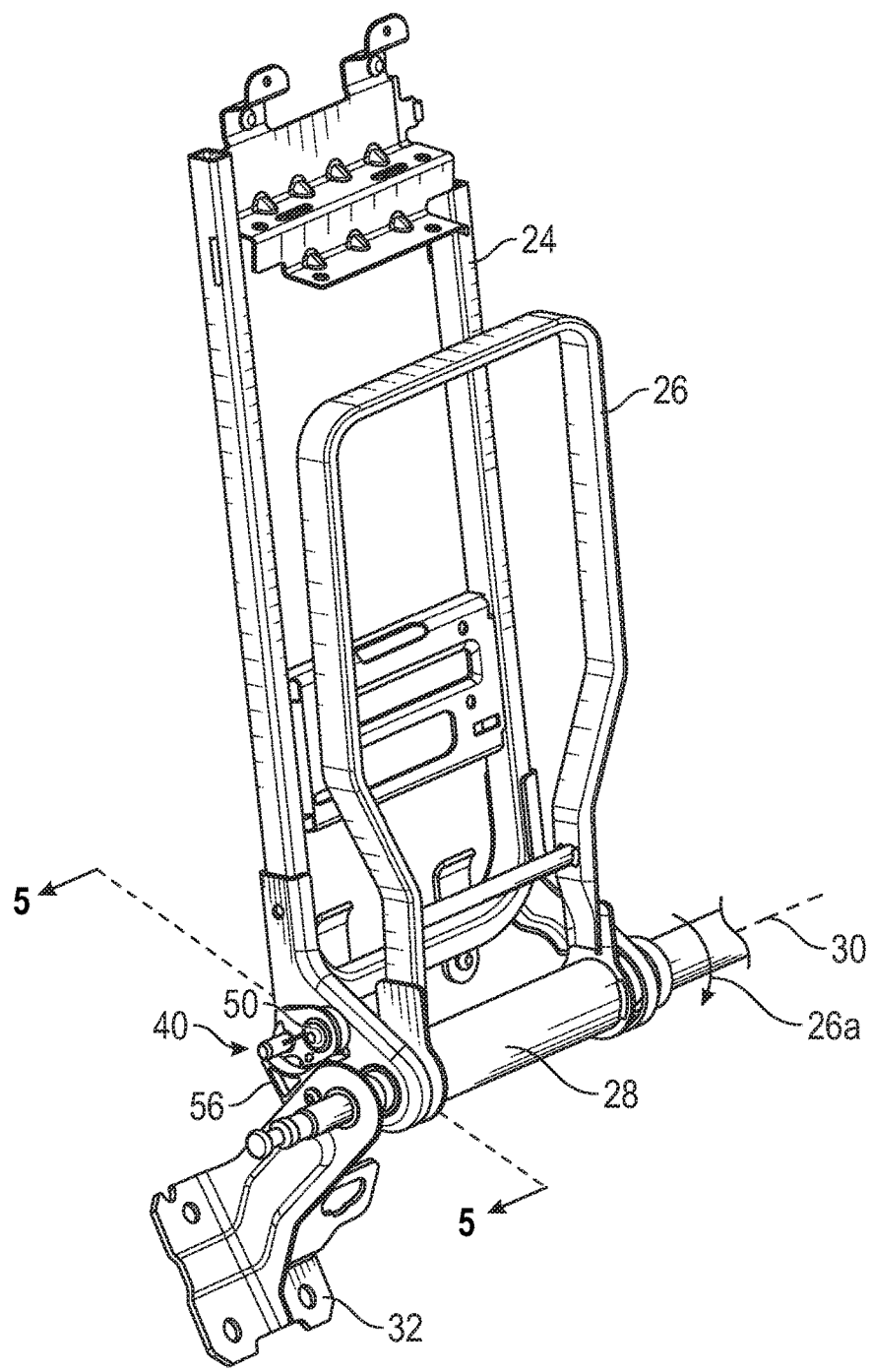
FIG. 4 is an enlarged perspective view of a seat back frame and an armrest frame of the bench seat illustrated in FIGS. 1, 2, and 3, wherein the armrest frame is shown in the stowed position.

Referring to FIG. 4, a perspective view of part of the seat assembly 14 is illustrated. FIG. 4 is illustrated with conventional foam and trim components of the seat 10 removed so that a seat back frame 24 and an armrest frame 26 are visible. In FIG. 4, the seat back frame 24 is shown in the upright position, and the armrest frame 26 is shown in the stowed position relative to the seat back frame 24. The seat back frame 24 and the armrest frame 26 are mounted on a seat back axle 28 for rotation about a rotation axis 30. In the illustrated embodiment, the seat back frame 24 and the armrest frame 26 rotate about the same rotation axis 30, but they may rotate about different axes if desired. The illustrated seat back axle 28 is attached to a base 32, and both the seat back frame 24 and the armrest frame 26 are able to rotate relative to the base 32. The illustrated base 32 is a metal bracket that is fixed to a vehicle frame (not shown). However, the seat back axle 28 may be attached to any desired structure in any desired manner.

Figure 5:
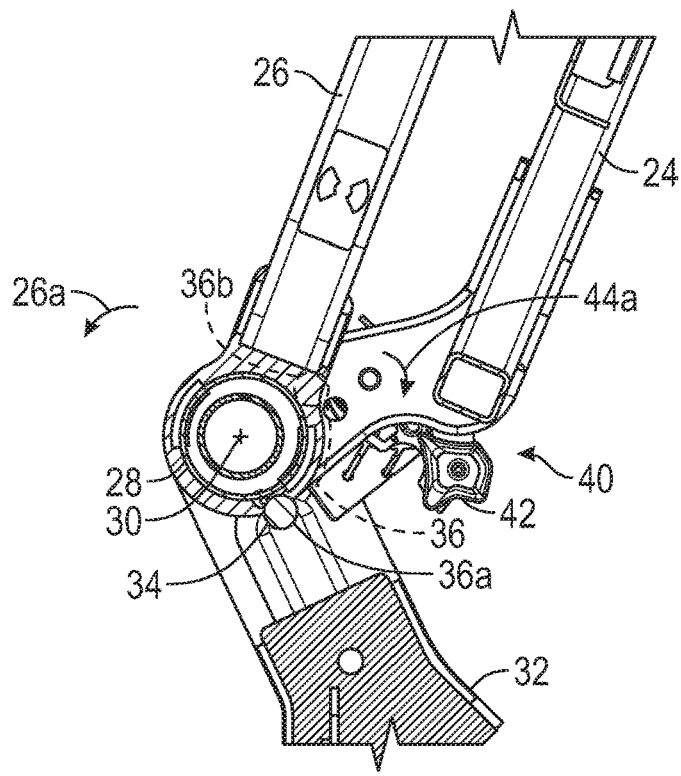
FIG. 5 is a cross-sectional view of portions of the seat back frame and the armrest frame taken along line 5-5 of FIG. 4.
Figure 6:
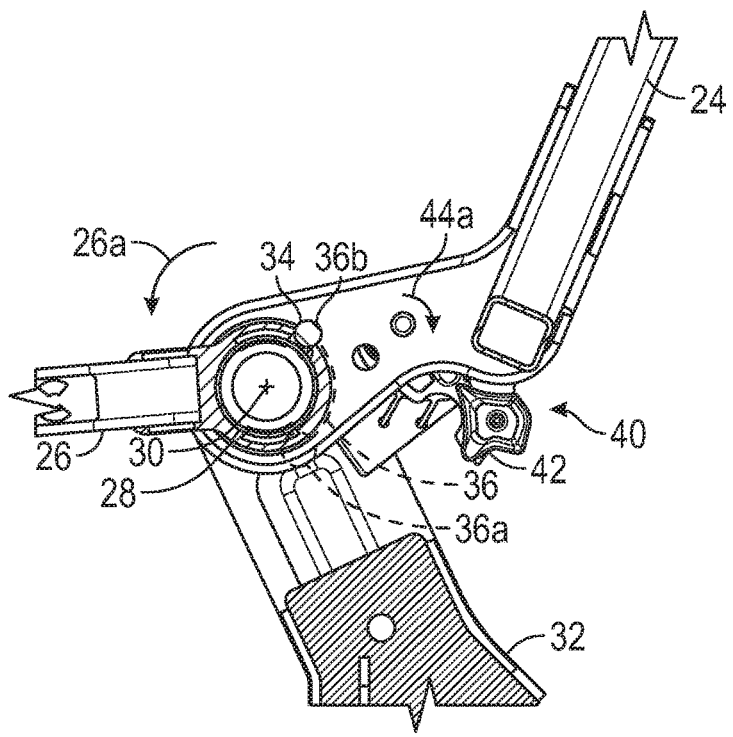
FIG. 6 is a cross-sectional view similar to FIG. 5, wherein the armrest frame is shown in the use position.

FIG. 5 is a cross-sectional view taken along the line 5-5 of FIG. 4 and perpendicular to the rotation axis 30. The armrest frame 26 includes a stop rod 34 that is fixed on the armrest frame 26. The illustrated stop rod 34 is made of steel, but it may be made of any desired material. Referring to FIG. 6, a cross-sectional view similar to that illustrated in FIG. 5 is shown, with the armrest frame 26 shown moved relative to the seat back frame 24 to the use position. The armrest frame 26 is moved in an armrest rotation direction 26a to move from the stowed position to the use position. It should be appreciated that FIG. 5 illustrates the seat back frame 24 and the armrest frame 26 in the configuration shown in FIG. 1, and FIG. 6 illustrates the armrest frame 26 in the configuration shown in FIG. 2. As can be seen in FIG. 6, when the armrest 22 is moved relative to the seat back 16 from the stowed position to the use position, the armrest frame 26 moves relative to the seat back frame 24, while the seat back frame 24 remains stationary relative to the base 32.

When the armrest frame 26 is moved relative to the seat back frame 24, the stop rod 34 also moves relative to the seat back frame 24. The stop rod 34 moves along a stop path 36 between a first stop position 36a (as shown in FIG. 5) and a second stop position 36b (as shown in FIG. 6). It should be appreciated that the stop rod 34 is fixed relative to the armrest 22, and the illustrated stop path 36 is defined based on the position of the stop rod 34 relative to the seat back frame 24. When the armrest 22 is in the use position, it may be moved back to the stowed position (illustrated in FIG. 1), and the armrest frame 26 will return to the position relative to the seat back frame 24 (illustrated in FIG. 5).

Figure 7:
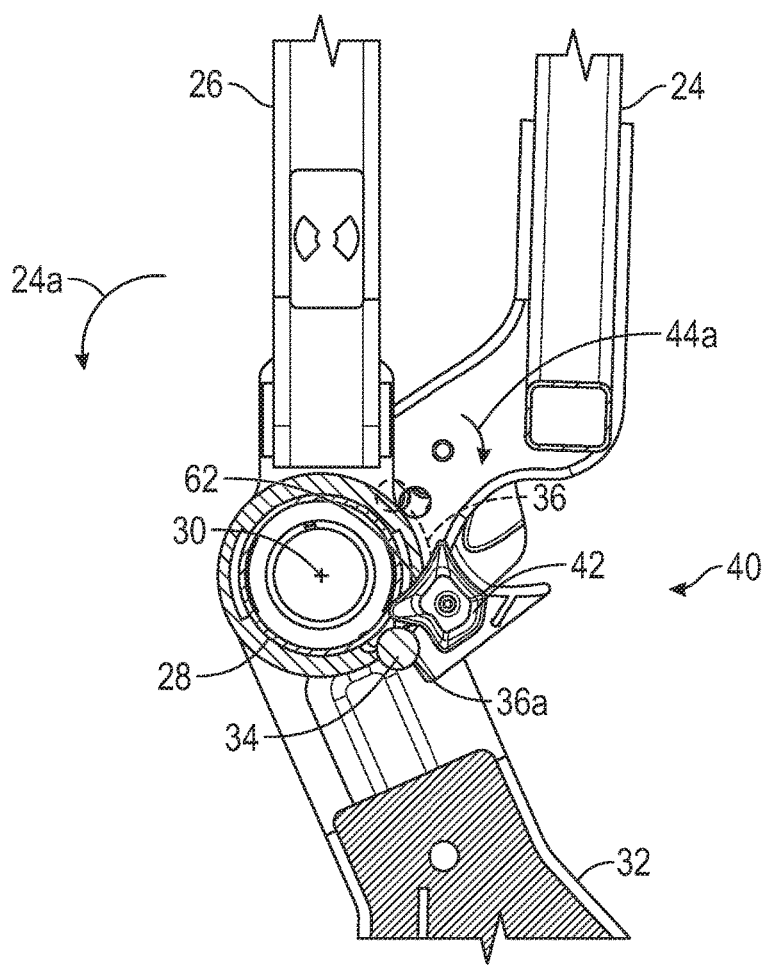
FIG. 7 is a cross-sectional view similar to FIG. 6, wherein the armrest frame is in the stowed position and the seat back frame is shown in an intermediate position.

Referring now to FIG. 7, a cross-sectional view similar to FIG. 5 is shown, with the seat back frame 24 moved from the upright position toward the folded position. The seat back frame 24 is shown in an intermediate position between the upright position (shown in FIG. 1) and the folded position (shown in FIG. 3). The seat back frame 24 is moved in a seat back rotation direction 24a to move from the upright position to the folded position. In the illustrated embodiment, the seat back rotation direction 24a is the same as the armrest rotation direction 26a because both the seat back 16 and the armrest 22 rotate about the same rotation axis 30. However, the seat back rotation direction 24a and the armrest rotation direction 26a may be different if desired. Additionally, the illustrated seat back rotation direction 24a and the armrest rotation direction 26a are in the same direction because both the seat back 16 and the armrest 22 rotate in a forward direction relative to the seat 10, as viewed by the occupants of the seat 10. However, the seat back rotation direction 24a and the armrest rotation direction 26a may be in any desired relative directions.

When the armrest 22 is in the stowed position relative to the seat back 16, and when the seat back 16 is moved in the seat back rotation direction 24a from the upright position toward the folded position, the armrest 22 will remain in position relative to the seat back 16 and will move with the seat back 16. As shown in the FIG. 2, the armrest nest 23 includes a back 38 that will engage the armrest 22 and move the armrest 22 in the seat back rotation direction 24a along with the seat back 16. As a result, as shown in FIG. 7, when the seat back frame 24 has been moved to the intermediate position, the stop rod 34 of the armrest frame 26 is still in the first stop position 36a relative to the seat back frame 24.

The seat 10 includes an armrest restrictor, indicated generally at 40. As will be described in detail below, the armrest restrictor 40 prevents movement of the armrest 22 relative to the seat back 16 when the seat back 16 is moved from the upright position toward the folded position, but allows movement of the armrest 22 relative to the seat back 16 when the seat back 16 is in the upright position. Referring back to FIG. 5, when the seat back 16 is in the upright position, the armrest restrictor 40 is in a release position. When the armrest restrictor 40 is in the release position, the armrest 22 can be moved between the stowed position and the use position, as shown in FIG. 5 and FIG. 6. When the seat back 16 is moved from the upright position to the intermediate position shown in FIG. 7, the armrest restrictor 40 moves relative to the seat back 16 from the release position to a block position. The armrest restrictor 40 includes a block 42. When the armrest restrictor 40 is in the block position, the block 42 is positioned in the stop path 36. As a result, the stop rod 34 on the armrest frame 26 will engage the block 42 and, as a result, will be unable to move in the armrest rotation direction 26a relative to the seat back frame 24.

Figure 8:
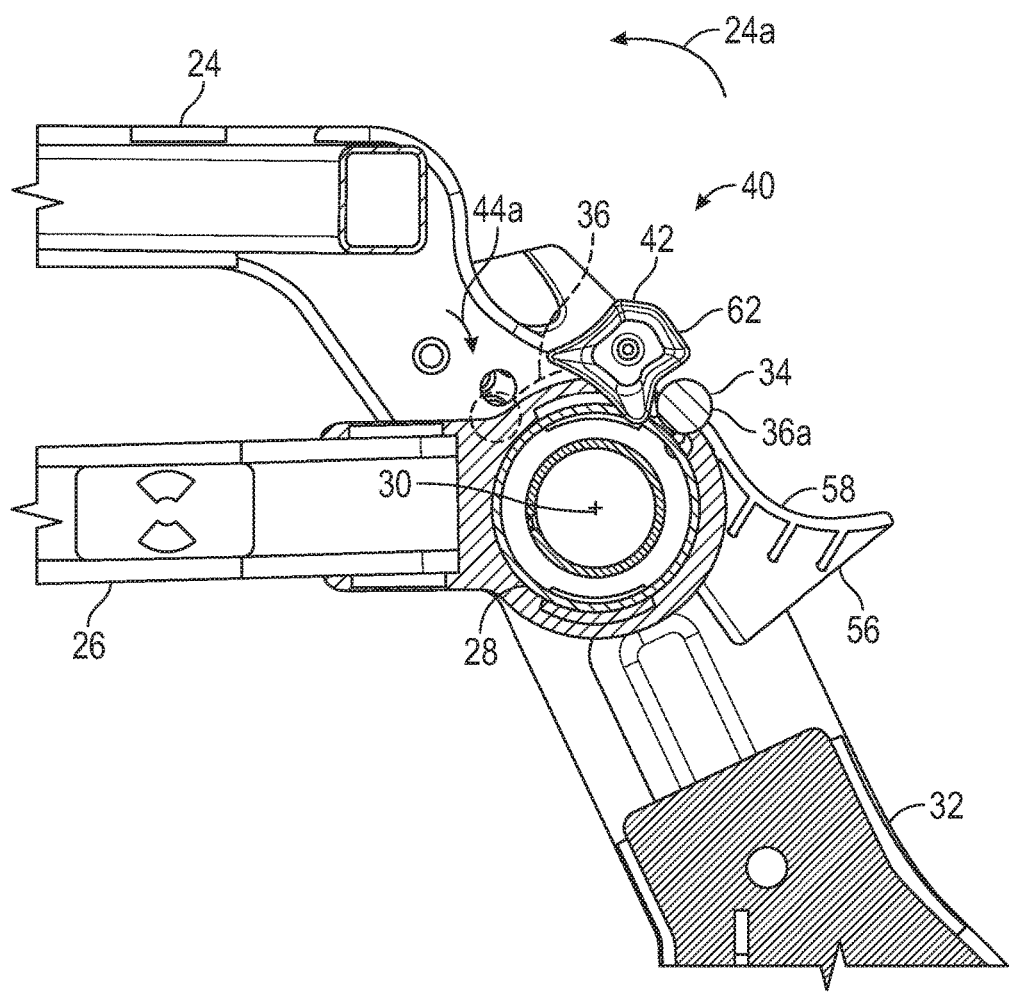
FIG. 8 is a cross-sectional view similar to FIG. 7, wherein the seat back frame is shown in a folded position.

Referring to FIG. 8, a cross-sectional view similar to FIG. 7 shows the seat back frame 24 in the folded position. As the seat back frame 24 is moved between the intermediate position (illustrated in FIG. 7) and the folded position (illustrated in FIG. 8), the armrest restrictor 40 does not move relative to the seat back frame 24. The block 42 remains in the stop path 36 and thus prevents the armrest frame 26 from moving relative to the seat back frame 24. As a result, the seat back frame 24, the armrest frame 26, and the armrest restrictor 40 all rotate together about the rotation axis 30 relative to the base 32. The cross-section illustrated in FIG. 8 shows the position of the seat back frame 24 and the armrest frame 26 when the seat is in the condition illustrated in FIG. 3, with the seat back 16 in the folded position.

From the folded position, the seat back 16 may be moved back toward the upright position. When the seat back 16 is moved in the direction opposite the seat back rotation direction 24a, the inertia of the armrest 22 will act to prevent the armrest 22 from moving with the seat back 16. If the seat back 16 moves relative to the armrest 22, the stop rod 34 moves along the stop path 36 relative to the seat back frame 24. However, as shown in FIG. 8, the block 42 is located in the stop path 36 and, thus, prevents the armrest frame 26 from moving relative to the seat back frame 24. As a result, as the seat back 16 is moved toward the upright position relative to the seat bottom 12, the armrest 22 is retained in position relative to the seat back 16 and moves with the seat back 16.

The block 42 remains in position relative to the seat back frame 24 until the seat back frame 24 is in the intermediate position (illustrated in FIG. 7). This intermediate position may be any desired position of the seat back frame 24 relative to the base 32 and is preferably a position at which the weight of the armrest 22 will not cause the armrest 22 to move in the armrest rotation direction 26a relative to the seat back 16 if the block 42 is removed from the stop path 36. With the seat back 16 in the intermediate position, further movement of the seat back 16 in the direction opposite the seat back rotation direction 24a will cause the armrest restrictor 40 to move relative to the seat back frame 24 back toward the release position. When the seat back 16 is returned to the upright position, the armrest restrictor 40 will return to the release position (shown in FIG. 5). With the armrest restrictor 40 in the release position, the block 42 is no longer located in the stop path 36, and the armrest 22 may be moved relative to the seat back 16.

Figure 9:
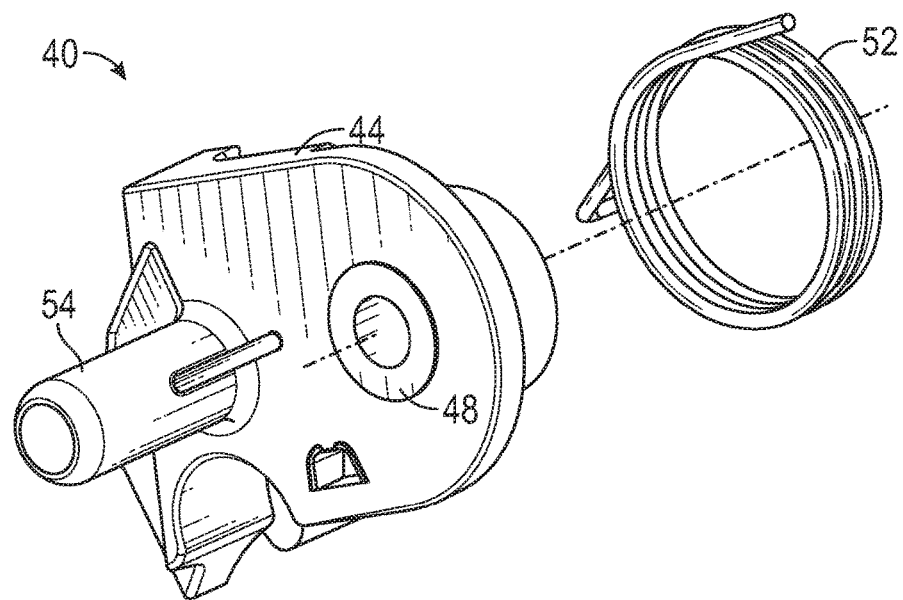
FIG. 9 is an exploded perspective view of an armrest restrictor.
Figure 10:
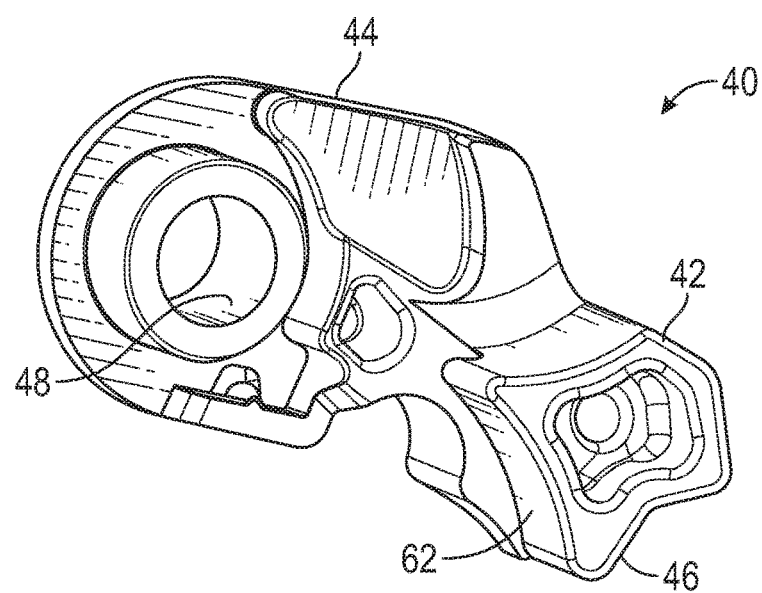
FIG. 10 is a perspective view of the armrest restrictor, taken from behind.

Referring to FIG. 9, an enlarged view of the armrest restrictor 40 is shown. The view of the armrest restrictor 40 illustrated in FIG. 9 is taken from the same perspective as FIG. 4. FIG. 10 illustrates the armrest restrictor 40 from an opposed side so that the block 42 is visible. The armrest restrictor 40 includes a restrictor body 44. The illustrated restrictor body 44 is made of plastic, but it may be made of any desired material. The block 42 is located on the restrictor body 44, and includes a block face 46. The block face 46 is engaged by the stop rod 34 when the armrest restrictor 40 is in the block position and retains the armrest 22 in the stowed position, as previously described.

The restrictor body 44 includes a mount hole 48. A screw 50 (shown in FIG. 4) is inserted through the mount hole 48 and is used to attach the restrictor body 44 to the seat back frame 24 for relative movement. However, the restrictor body 44 may be attached to any desired part of the seat 10 and may be attached using any desired fastener or method. Referring back to FIG. 9, the armrest restrictor 40 includes a biasing element 52. The illustrated biasing element 52 is a torsion spring that is located around the mount hole 48 and engages the seat back frame 24 and the restrictor body 44. However, the biasing element 52 may be any desired component that biases the restrictor body 44, as described below.

Figure 11:
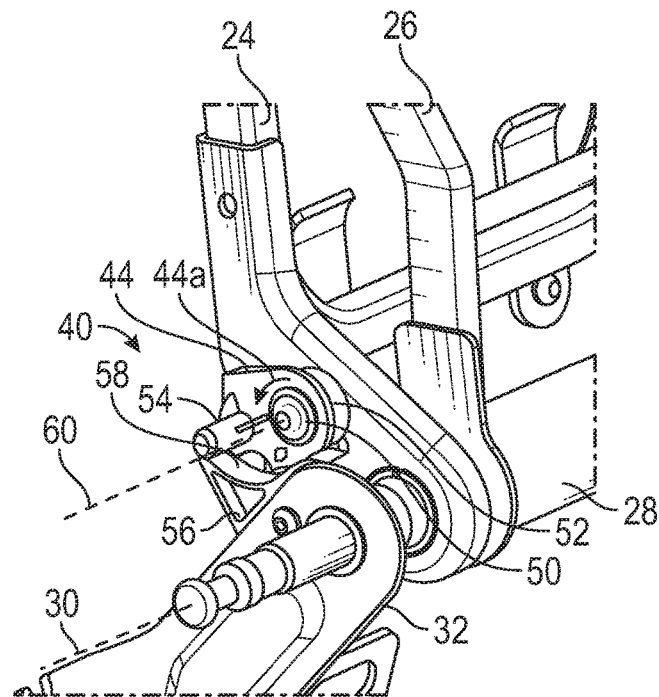
FIG. 11 is an enlarged perspective view of portions of the seat back frame and the armrest frame shown in FIG. 4, illustrating the armrest restrictor.

The restrictor body 44 includes a restrictor stop 54 that functions to limit the movement of the restrictor body 44 relative to the seat back frame 24. The illustrated restrictor stop 54 is a molded post that extends from the restrictor body 44, but the restrictor stop 54 may have any desired shape and may be in any desired location. Referring to FIG. 11, an enlarged view of a portion of FIG. 4 is illustrated that shows the armrest restrictor 40 when the seat back frame 24 is in the upright position. The seat 10 includes a ramp 56 attached to the base 32. The illustrated ramp 56 is made of plastic, but it may be made of any desired material and may be located in any desired location. The ramp 56 includes a stop surface 58 that is oriented toward the restrictor body 44. The illustrated stop surface 58 has an arcuate shape, but it may have any desired shape.

As previously described, the restrictor body 44 is attached to the seat back frame 24 for relative movement. The restrictor body 44 may rotate relative to the seat back frame 24 about a restrictor axis 60 that extends through the mount hole 48. The biasing element 52 biases the restrictor body 44 in a restrictor rotation direction 44a so that the restrictor stop 54 engages the stop surface 58. As the seat back frame 24 is moved relative to the base 32, the restrictor body 44 will move relative to the ramp 56, while the biasing element 52 will continue to press the restrictor stop 54 against the stop surface 58. As a result, the restrictor body 44 will move relative to the seat back frame 24. In the illustrated embodiment, the ramp 56 is a separate piece attached to the base 32, but the restrictor body 44 may directly engage the base 32 or any other desired component.

Referring back to FIG. 2, it should be appreciated that the seat back 16 may be moved from the upright position to the folded position when the armrest 22 is already in the use position. The configuration of the seat back frame 24 and the armrest frame 26 would initially be as illustrated in FIG. 6, with the stop rod 34 in the second stop position 36b relative to the seat back frame 24. As previously described, as the seat back frame 24 is moved from the upright position toward the folded position, the block 42 moves from the release position to the block position, where the block 42 is located in the stop path 36. As the seat back frame 24 is moved toward the folded position, the stop rod 34 will move along the stop path 36 from the second stop position 36b toward the first stop position 36a as the seat back frame 24 moves in the seat back rotation direction 24a relative to the armrest frame 26.

The block 42 includes a release face 62 that is located in the stop path 36 when the restrictor body 44 is in the block position, and on an opposite side of the block 42 from the block face 46. The release face 62 is angled relative to the stop path 36 so that when the stop rod 34 engages the release face 62 as the seat back frame 24 is moved toward the folded position, the block 42 is moved against the force of the biasing element 52 away from the block position and out of the stop path 36. This allows the block 42 to travel past the stop rod 34 and the seat back frame 24 to continue to be moved in the seat back rotation direction 24a. Once the block 42 has moved past the stop rod 34, the biasing element 52 will push the block 42 back into the block position, as illustrated in FIG. 8.

Figure 12:
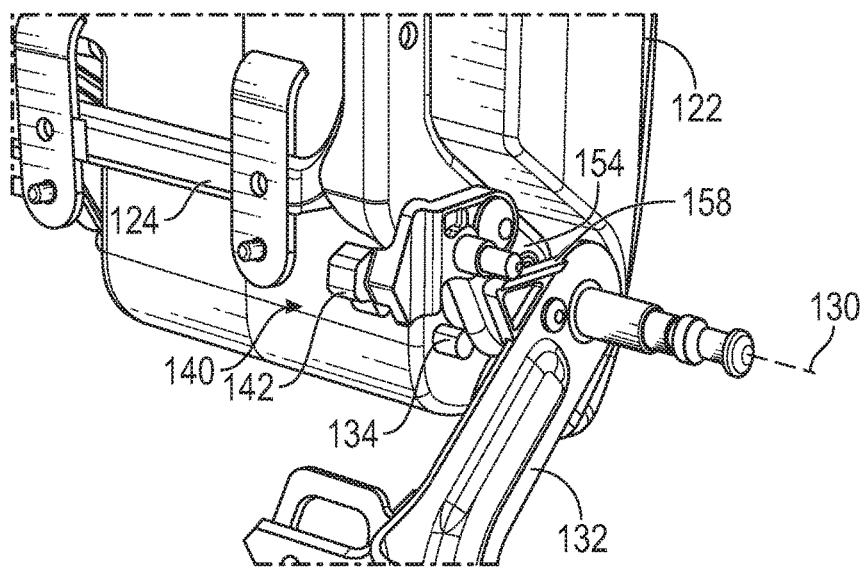
FIG. 12 is a perspective view of an alternative embodiment of a seat frame and an armrest frame, including an alternative embodiment of a restrictor, showing the alternative armrest frame in a stowed position and the alternative seat frame in an upright position.

Referring to FIG. 12, a perspective view of an alternative embodiment of the invention is illustrated. Components in the alternative embodiment which are substantially the same as the previously described components are incremented by one hundred and will not be described in detail. FIG. 12 shows an armrest 122 and a seat back frame 126 attached to a base 132. A restrictor body 144 is attached to the seat back frame 126 for relative rotation and is biased into engagement with a stop surface 158 of a ramp 156 attached to the base 132. In the alternative embodiment, the stop surface 158 has a linear shape as opposed to the arcuate shape previously described. The view in FIG. 12 is shown from behind so that a restrictor stop 154 and a block 138 of the restrictor body 144 are visible. The seat back frame 124 is shown in an upright position in FIG. 12.

Figure 13:
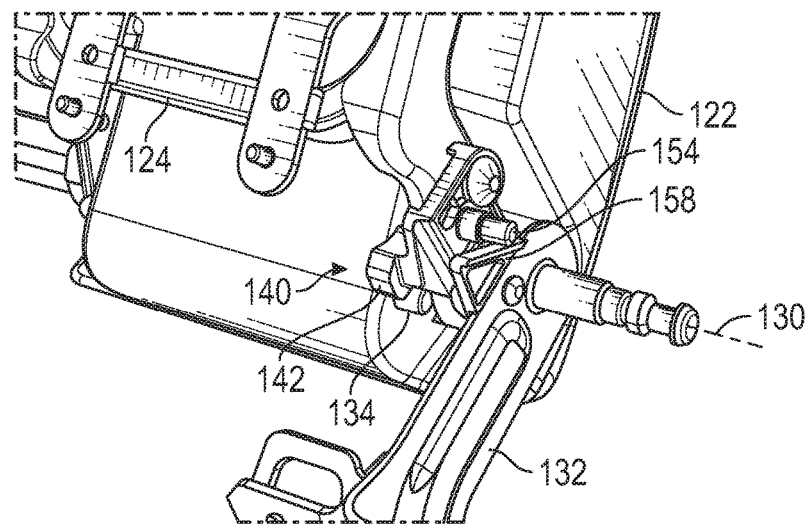
FIG. 13 is a perspective view similar to FIG. 12, showing the alternative seat frame in an intermediate position.

Referring to FIG. 13, a view similar to FIG. 12 is shown, wherein the seat back frame 124 is shown moved to an intermediate position relative to the base 132. The restrictor body 144 is shown moved about a restrictor axis 160 so that the restrictor stop 154 remains engaged with the stop surface 158. It should be appreciated that a biasing element (which is not visible in FIG. 13) biases the restrictor body 144 against the stop surface 158. However, the weight of the restrictor body 144 may be sufficient to provide the biasing force, if desired. As shown, the armrest 122 has moved with the seat back frame 124.

Figure 14:
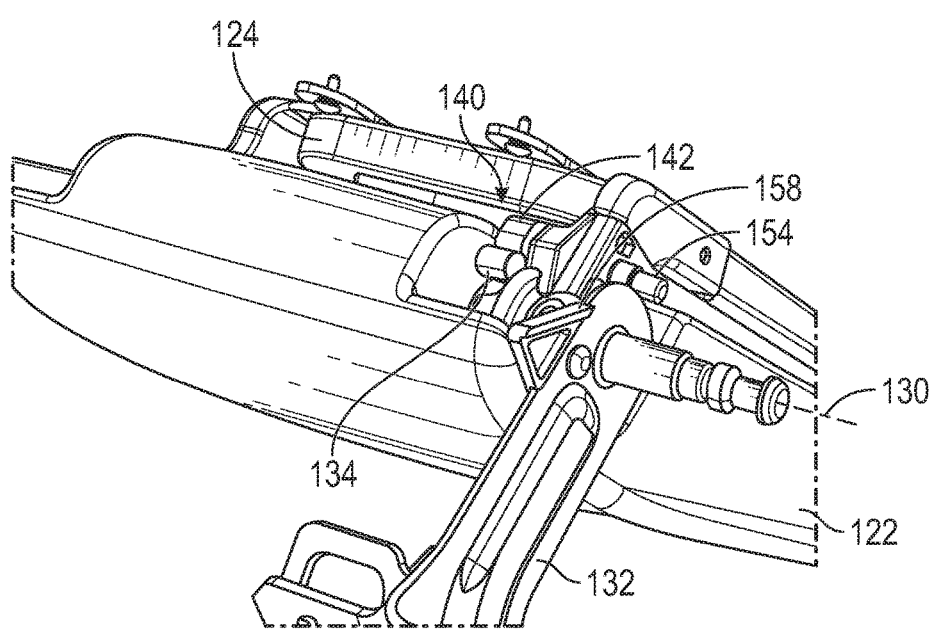
FIG. 14 is a perspective view similar to FIG. 13 showing the alternative seat frame in a folded position.

Referring to FIG. 14, a view similar to FIG. 13 is shown, wherein the seat back frame 124 shown moved to a folded position relative to the base 132. As shown, the restrictor body 144 is no longer engaged with the stop surface 158, but rather is in a block position where the block 138 engages a stop rod 134 on the armrest 122 to prevent the armrest 122 from moving relative to the seat back frame 124. If the seat back frame 124 is moved from the folded position back to the upright position, the restrictor body 144 will remain in the block position until the restrictor stop 154 engages the stop surface 158. Further movement of the seat back frame 124 toward the upright position will cause the restrictor body 144 to move relative to the seat back frame 124 back to a release position, shown in FIG. 12.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A seat assembly comprising:
a seat back that is mounted for relative movement between a first seat position and a second seat position;
an armrest that is mounted for relative movement between a stowed position and a use position;
an armrest restrictor that prevents movement of the armrest relative to the seat back when the seat back is moved from the first seat position toward the second seat position and allows movement of the armrest relative to the seat back when the seat back is in the first seat position;
a stop rod that is fixed to the armrest and that moves relative to the seat back along a stop path when the armrest is moved between the stowed position and the use position; and
a block on the armrest restrictor that is mounted for movement relative to the armrest between a release position, wherein the block is not located in the stop path, and a block position, wherein the block is located in the stop path, wherein either:
(1) the block is in the release position when the seat back is in the first seat position, and wherein the block is in the block position when the seat back is in the second seat position; or
(2) a biasing element biases the block to the block position, and wherein when the seat back is in the first seat position, the armrest restrictor is engaged with the base and the block is moved to the release position; or
(3) the armrest restrictor includes a restrictor body mounted for rotational movement relative to the seat back, and wherein the block extends from the restrictor body; or
(4) a release face is provided on the block, wherein the release face is located in the stop path when the block is in the block position, and wherein when the armrest is in the use position and the seat back is moved to the second seat position, the stop rod engages the release face and biases the block out of the block position.

2. The seat assembly of claim 1, wherein the seat back is mounted on a base for relative rotational movement between the first seat position and the second seat position.

3. The seat assembly of claim 1, wherein the block is mounted on the seat back for relative movement.

4. The seat assembly of claim 1, wherein the block is mounted on the seat back for relative rotational movement.

5. The seat assembly of claim 1, wherein the block is in the release position when the seat back is in the first seat position, and wherein the block is in the block position when the seat back is in the second seat position.

6. The seat assembly of claim 1, further including a biasing element that biases the block to the block position, and wherein when the seat back is in the first seat position, the armrest restrictor is engaged with the base and the block is moved to the release position.

7. The seat assembly of claim 1, wherein the armrest restrictor includes a restrictor body mounted for rotational movement relative to the seat back, and wherein the block extends from the restrictor body.

8. The seat assembly of claim 7, wherein the armrest restrictor includes a biasing element that biases the block toward the block position.

9. The seat assembly of claim 8, wherein the armrest restrictor includes a restrictor stop that engages the base to move the block to the release position when the seat back is in the first seat position.

10. The seat assembly of claim 1, further including a release face on the block, wherein the release face is located in the stop path when the block is in the block position, and wherein when the armrest is in the use position and the seat back is moved to the second seat position, the stop rod engages the release face and biases the block out of the block position.

11. The seat assembly of claim 10, wherein the armrest restrictor includes a biasing element that biases the block toward the block position.

12. The seat assembly of claim 11, wherein the armrest restrictor includes a restrictor stop that engages the base to move the block to the release position when the seat back is in the first seat position.

13. A seat assembly comprising:
   a seat back mounted for relative rotational movement between an upright position and a folded position, the base including a stop surface;
   an armrest mounted for rotational movement relative to the seat back between a stowed position and a use position, the armrest including a stop rod that moves relative to the seat back along a stop path when the armrest is moved relative to the seat back; and
   an armrest restrictor including:
      a restrictor body attached to the seat back for relative rotational movement between a release position and a block position;
      a block attached to the restrictor body, wherein the block is located in the stop path when the restrictor body is in the block position and wherein the block is not located in the stop path when the restrictor body is in the release position;
      a biasing element that applies a bias force on the restrictor body to bias the restrictor body toward the block position; and
      a restrictor stop attached to the restrictor body, wherein the restrictor stop is engaged with the stop surface when the seat back is in the upright position and the restrictor body is moved out of the stop position against the bias force.

14. The seat assembly of claim 13, further including a release face on the block, wherein the release face is located in the stop path when the restrictor body is in the block position, and wherein when the armrest is in the use position and the seat back is moved to the folded position, the stop rod engages the release face and biases the block out of the block position.

* * * * *